US008622288B2

(12) United States Patent
Matsumoto

(10) Patent No.: US 8,622,288 B2
(45) Date of Patent: Jan. 7, 2014

(54) MONEY HANDLING SYSTEM

(75) Inventor: Yasuhiro Matsumoto, Himeji (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 2 days.

(21) Appl. No.: 12/737,934

(22) PCT Filed: Sep. 3, 2008

(86) PCT No.: PCT/JP2008/065889

§ 371 (c)(1), (2), (4) Date: Mar. 2, 2011

(87) PCT Pub. No.: WO2010/026631

PCT Pub. Date: Mar. 11, 2010

(65) Prior Publication Data

US 2011/0153059 A1 Jun. 23, 2011

(51) Int. Cl.
*G06Q 40/00* (2012.01)

(52) U.S. Cl.
USPC .......... 235/379

(58) Field of Classification Search
USPC .......... 235/379, 383, 381
See application file for complete search history.

(56) References Cited

U.S. PATENT DOCUMENTS 6,230,928 B1 5/2001 Hanna et al.
7,954,699 B1 * 6/2011 Sanders et al. .......... 235/379
2002/0153414 A1 * 10/2002 Stoutenburg et al. .......... 235/380
2003/0083969 A1 5/2003 Uchiyama et al. .......... 705/35
2004/0117061 A1 6/2004 Angove et al.
2009/0101723 A1 * 4/2009 Uehara et al. .......... 235/7 A

FOREIGN PATENT DOCUMENTS

JP 2003-263682 9/2003 .......... G07G 1/12

OTHER PUBLICATIONS

European Search Report (Application No. 08809944.5—PCT/JP2008/065889) (5 pages—dated Aug. 11, 2012).

* cited by examiner

*Primary Examiner* — Ahshik Kim

(74) *Attorney, Agent, or Firm* — Renner, Kenner, Grieve, Bobak, Taylor & Weber

(57) ABSTRACT

A money handling system includes a money handling machine that has a money storage unit for storing money, and a money recycling unit for temporarily storing money taken from the exterior of the money handling machine after the money is recognized. The money recycling unit is adapted to feed the money temporarily stored therein to the money storage unit and/or to dispense the temporarily stored money to the exterior of the money handling machine. A wrapped-coin dispensing unit for storing wrapped coins and for dispensing the wrapped coins to the exterior of the money handling machine is also provided. Finally, a central control unit communicates with various components of the money handing machine, while being isolated therefrom.

8 Claims, 7 Drawing Sheets

MONEY HANDLING SYSTEM

FIELD OF THE INVENTION

This invention relates to a money handling system adapted for temporarily storing money, which is taken from the exterior to the interior of a casing and includes banknotes, coins and/or the like, in a recycling money storage unit, after recognizing the money, as well as adapted for feeding the money once stored in the recycling money storage unit to a money storage unit and/or dispensing the money to the exterior of the casing. It is noted that the term "money", as used herein, may include banknotes and/or coins.

BACKGROUND ART

In the past, a money handling machine, which is adapted for depositing the money, such as sales proceeds or the like, in a store or the like, dispensing the money, such as changes or the like, and delivering the money to a designated collector, such as a staff or the like of an armored car company, in charge of collecting the sales proceeds or the like, has been known. This money handling machine includes a money storage unit configured for storing therein the money, and a money recycling unit configured for temporarily storing therein the money taken from the exterior to the interior of the casing of the machine, as well as adapted for feeding the money temporarily stored in this money recycling unit or money taken from the exterior to the interior of the casing, to the money storage unit, or otherwise dispensing such money to the exterior of the casing. In this case, the authority, under which the money stored in the money recycling unit (or money stored in an upper part of the money handling machine) is controlled, is separated from the authority, under which the money stored in the money storage unit (or money stored in a lower part of the money handling machine) is controlled. Namely, the former control authority is provided on the side of the store, which is hence suitable for performing a depositing process and/or dispensing process for the money, relative to the money handling machine, while the latter control authority is provided on the side of the designated collector collecting the banknote from the money handling machine. Therefore, each operation, for depositing, dispensing, delivering or the like, for the money stored in the upper part of the money handling machine, and/or access to deposit/dispense information and/or total amount data, in regard to the money stored in the upper part of the money handling machine, can be performed by only an operator authorized on the side of the store. Meanwhile, the money stored in the lower part of the money handling machine can be collected by only the designated collector.

JP2003-141609A discloses a money deposit/dispense machine designed for use in the store or the like. Namely, this money deposit/dispense machine is generally installed in the store, and is adapted for depositing therein the sales proceeds of the store, as well as for dispensing therefrom the money, such as changes or the like, prepared for the store (i.e., a fund of the store). More specifically, in this money deposit/dispense machine, the control authority, under which the money to be stored, as the fund of the store, in a recycling storage unit and then dispensed, as the changes or the like, in the store, is controlled, is separated from the control authority, under which the sales proceeds of the store that will be transferred to a financial institution or the like, without being dispensed. In the case of dispensing the money prepared for the store (or fund of the store), the total amount of money to be dispensed is first inputted, and then the money corresponding to the inputted total amount of money is fed out from the recycling storage unit and dispensed from the money deposit/dispense machine. Meanwhile, the money, as the sales proceeds of the store, which is delivered to the armored car company or the like, will be collected by the armored car company. With this collecting process, money transfer data, on the money delivered to the armored car company or the like, is prepared to be sent to the financial institution or the like, by a host computer installed in the armored car company or the like, or by another host computer installed in the store. Thereafter, the money delivered to the armored car company or the like will be deposited in a bank count of the store. Further, money deposit/dispense data or the like, in regard to this money deposit/dispense machine, can be transmitted to the host computer of the armored car company or the like.

DISCLOSURE OF THE INVENTION

In the money deposit/dispense machine designed for use in the store and described in the above JP2003-141609A, loose banknotes and loose coins can be prepared as the fund of the store. Actually, however, it is also necessary to prepare wrapped coins, as the changes used in the store, in addition to the loose banknotes and loose coins. However, in the conventional money deposit/dispense machine as designed for use in the store, the wrapped coins cannot be prepared, as the changes or the like to be used in the store. Therefore, the operator on the side of the store should send an order to the armored car company or the like for such wrapped coins. For instance, for each day of the week, the operator on the side of the store sends information, by fax, to the armored car company or the like, about each denomination of the wrapped coins required and/or on the number or total amount of such wrapped coins for each denomination. Alternatively or additionally, the operator orders the wrapped coins from the armored car company or the like, based on the past ordering record. Of course, such wrapped coins should not be short of the number thereof, required for the fund of the store. Therefore, such wrapped coins may tend to be often provided, more than actually required, to the store from the armored car company or the like, leading to substantial degradation of the capital efficiency of the store.

The present invention was made in light of such circumstances. Therefore, it is an object of this invention to provide a money handling system, in which a wrapped-coin dispensing unit is provided to a money handling machine installed in the store, such that signal transmission and/or reception can be performed between the wrapped-coin dispensing unit and a central control unit, whereby, in this money handling system, the wrapped coins can be prepared, as the fund of the store, such as the changes or the like, in addition to the loose banknotes and/or loose coins.

The money handling system of the present invention is adapted for depositing and/or dispensing the money, and includes: a money handling machine including a money storage unit configured for storing therein the money, a money recycling unit adapted for temporarily storing the money taken from the exterior to the interior of the money handling machine, in a recycling money storage unit, after the money is recognized, as well as adapted for feeding the money once stored in the recycling money storage unit to the money storage unit and/or dispensing such money to the exterior of the money handling machine, a wrapped-coin dispensing unit adapted for storing wrapped coins, in a wrapped-coin storage unit, as well as adapted for dispensing the wrapped coins stored in the wrapped-coin storage unit to the exterior of the money handling machine, and a control unit adapted for controlling the money storage unit, money recycling unit and wrapped-coin dispensing unit; and a central control unit connected, for communication, with the money handling machine and capable of performing remote control of the money handling machine; and the central control unit is adapted for transmitting and receiving a signal relative to each of the money storage unit and wrapped-coin dispensing unit, in the money handling machine.

In the money handling system of the present invention, it is preferred that the money recycling unit is arranged to be controlled under a first control authority, while the money storage unit and wrapped-coin dispensing unit are respectively arranged to be controlled under a second control authority.

In the money handling system of the present invention, it is preferred that once the money stored in the recycling money storage unit of the money recycling unit is fed to the money storage unit, the control authority, under which such money is controlled, is changed from the first control authority to the second control authority, and then the total amount of money, corresponding to the money fed to the money storage unit, is deposited to an account of a financial institution related to the first control authority, and once the wrapped coins stored in the wrapped-coin storage unit of the wrapped-coin dispensing unit is dispensed to the exterior of the money handling machine, the control authority, under which such wrapped coins are controlled, is changed from the second control authority to the first control authority, and then the total amount of money, corresponding to such wrapped coins, is withdrawn from the account of the financial institution related to the first control authority.

In the money handling system of the present invention, it is preferred that the money handling system further comprises an operation unit adapted for allowing an operator to select a plurality of operation modes including a money exchange mode, and when the money exchange mode is selected via the operation unit, the control unit of the money handling machine serves to control the money storage unit to store therein the money deposited into the money handling machine, and then control the money recycling unit and/or wrapped-coin dispensing unit to dispense the exchange money, and finally transmit information on this money exchange process to the central control unit. Herein, as the exchange money, the wrapped coin and recycled banknote can be mentioned.

Alternatively, the money handling system may further comprise a operation unit adapted for allowing an operator to select a plurality of operation modes including a money exchange mode, when the money exchange mode is selected via the operation unit, the control unit of the money handling machine may serve to control the money storage unit to store therein the money deposited into the money handling machine, and then transmit information on this storage process to the central control unit, the central control unit may serve to determine whether or not the information on the storage process is appropriate, and when determining that the information on the storage process is appropriate, the central control unit transmits information on the money exchange process to the control unit of the money handling machine, and the control unit of the money handling machine may serve to control the money recycling unit and/or wrapped-coin dispensing unit to dispense the exchange money, based on the information on the money exchange process transmitted from the central control unit.

In the above money handling system, it is preferred that when the money exchange mode is selected via the operation unit, one or more denominations of exchange money and the number or total amount of money for each denomination of exchange money are inputted via the operation unit, and the control unit serves to control the money recycling unit and/or wrapped-coin dispensing unit to dispense the money of the inputted one or more denominations of exchange money, from the money handling machine, based on the inputted number or total amount of money.

Alternatively, the money handling system may further comprise an operator identification unit adapted for identifying information on the operator, a memory unit adapted for storing therein information on one or more money exchange patterns, provided for each operator and including one or more denominations of exchange money and the number or total amount of money for each denomination of exchange money regarding the money exchange process, and a selection unit configured for allowing the operator to select the one or more money exchange patterns stored in the memory, and once the information of the operator is identified by the operator identification unit, the control unit may serve to control the money recycling unit and/or wrapped-coin dispensing unit to dispense the money of one or more denominations of exchange money in one money exchange pattern selected by the operator via the selection unit, among the one or more money exchange patterns stored in the memory, from the money handling machine, based on the number or total amount of the money stored in the memory.

DETAILED DESCRIPTION OF THE INVENTION

Hereinafter, a money handling system of one exemplary embodiment of the present invention will be described with reference to the drawings. The money handling system related to this embodiment includes a money handling machine and a central control unit. This money handling machine includes a money storage unit arranged to be controlled on the side of the designated collector, a money recycling unit arranged to be controlled on the side of the store, and a wrapped-coin dispensing unit arranged to be controlled on the side of the designated collector. In this embodiment, the money storage unit, money recycling storage unit and wrapped-coin dispensing unit are respectively provided in one case of the money handling machine. Further, in this embodiment, commands and data can be transmitted and/or received between the central control unit and each of the money storage unit, money recycling unit and wrapped-coin dispensing unit. As such, the money handling machine can be operated and/or managed on the side of the central control unit, without any authorized operator being always present in each store where the money handling machine is installed.

Figure 1A:
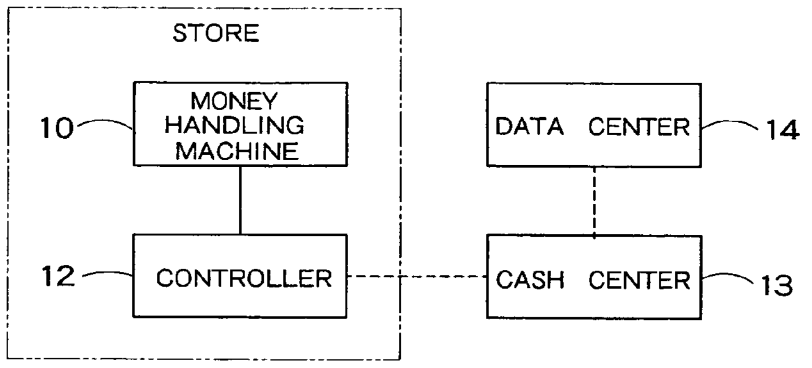
FIG. 1A is a block diagram illustrating general construction of a money handling system related to one embodiment of the present invention.
Figure 1B:
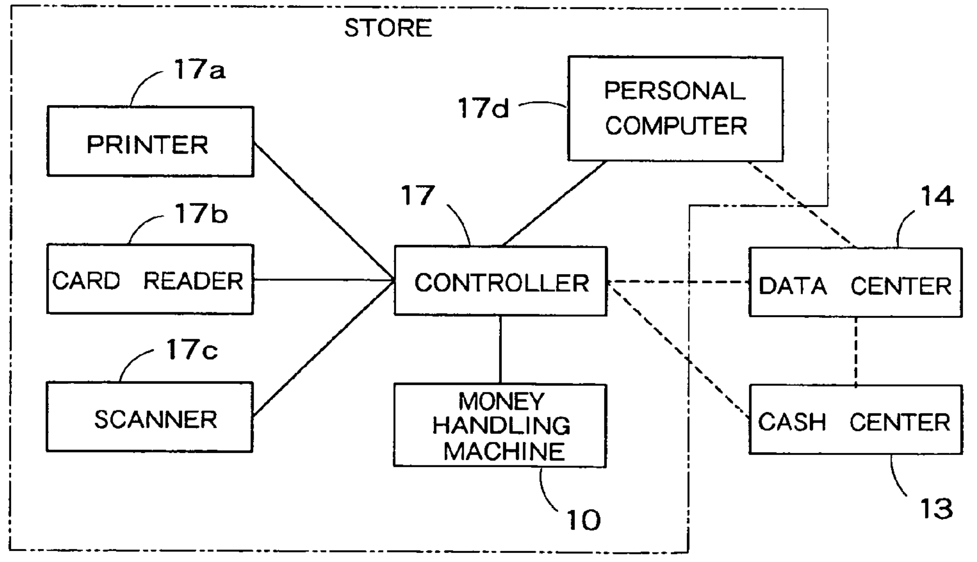
FIG. 1B is a block diagram illustrating another construction of the money handling system related to the embodiment of the present invention.
Figure 2A:
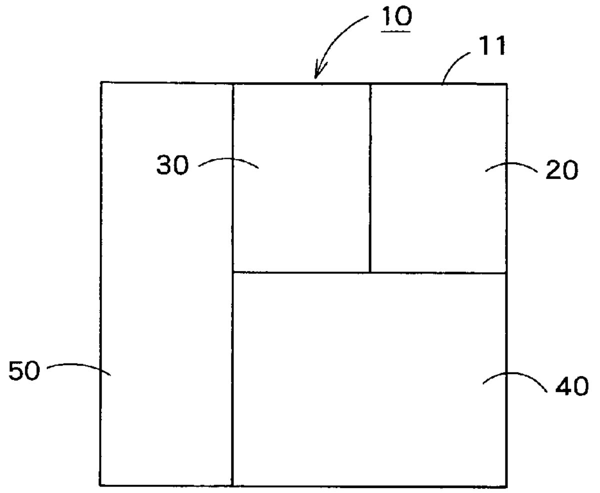
FIG. 2A is a diagram schematically illustrating construction of the money handling machine provided to the money handling system shown in FIG. 1A or 1B.
Figure 2B:
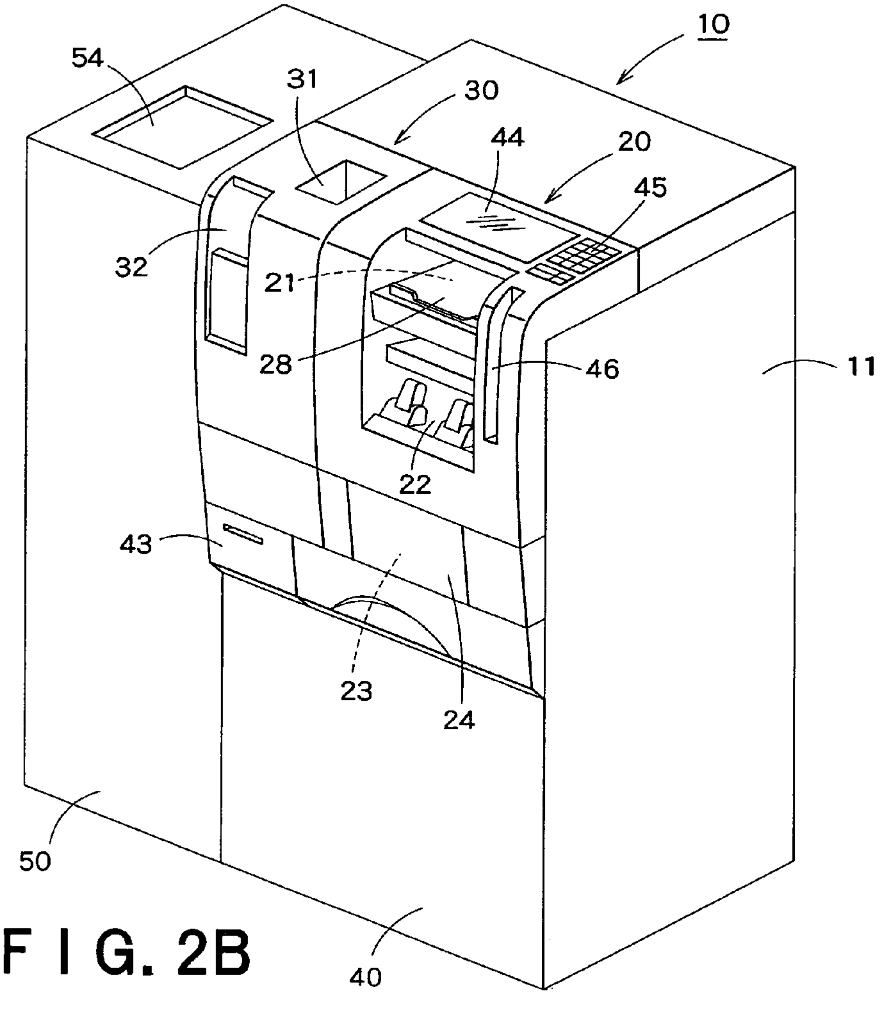
FIG. 2B is a perspective view of the money handling machine shown in FIG. 2A.
Figure 3A:
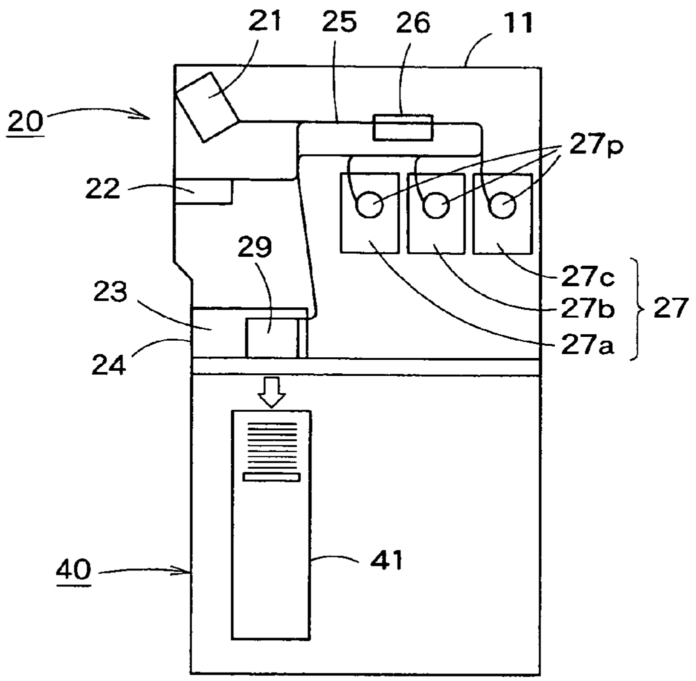
FIG. 3A is a diagram schematically illustrating construction of a banknote handling machine provided to the money handling machine shown in FIG. 2A or 2B.
Figure 3B:
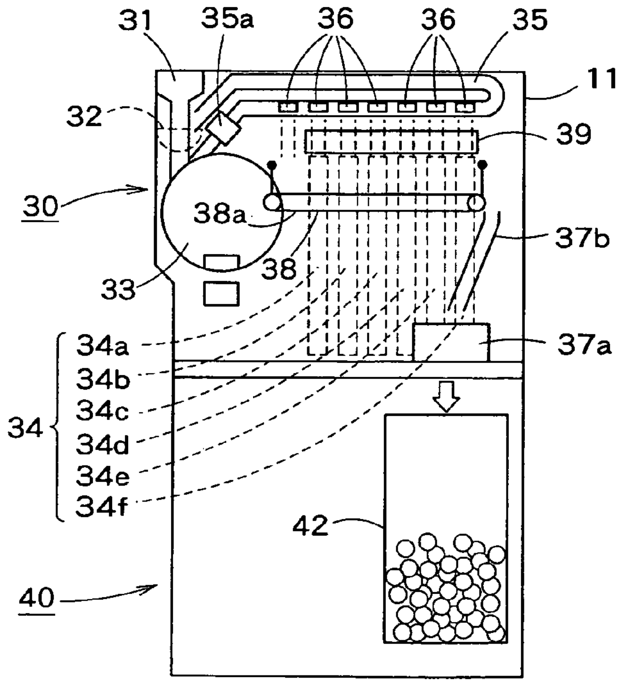
FIG. 3B is a diagram schematically illustrating construction of a coin handling machine provided to the money handling machine shown in FIG. 2A or 2B.
Figure 3C:
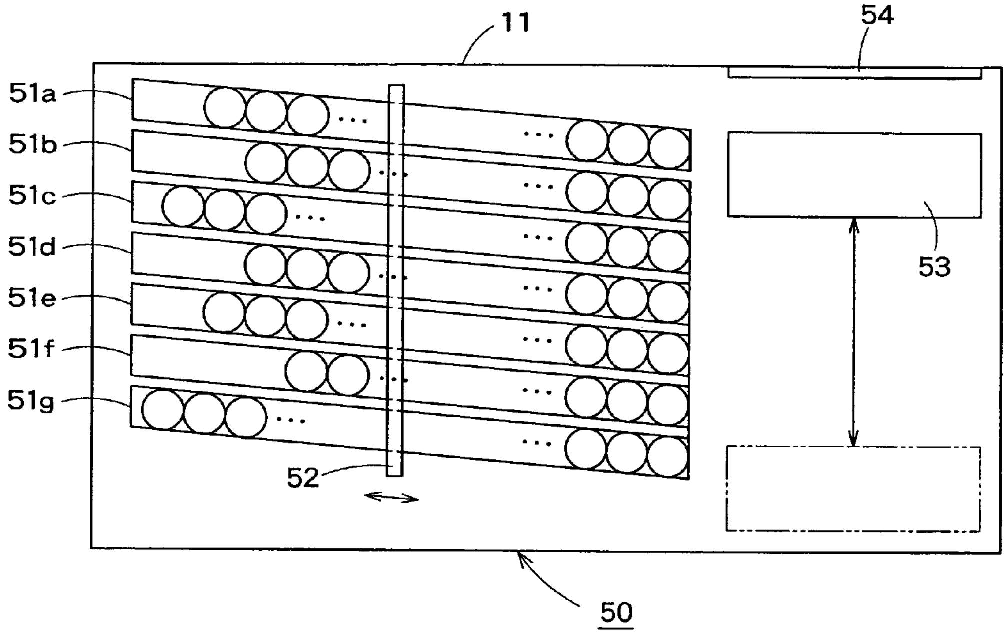
FIG. 3C is a diagram schematically illustrating construction of a wrapped-coin dispensing machine provided to the money handling machine shown in FIG. 2A or 2B.
Figure 4:
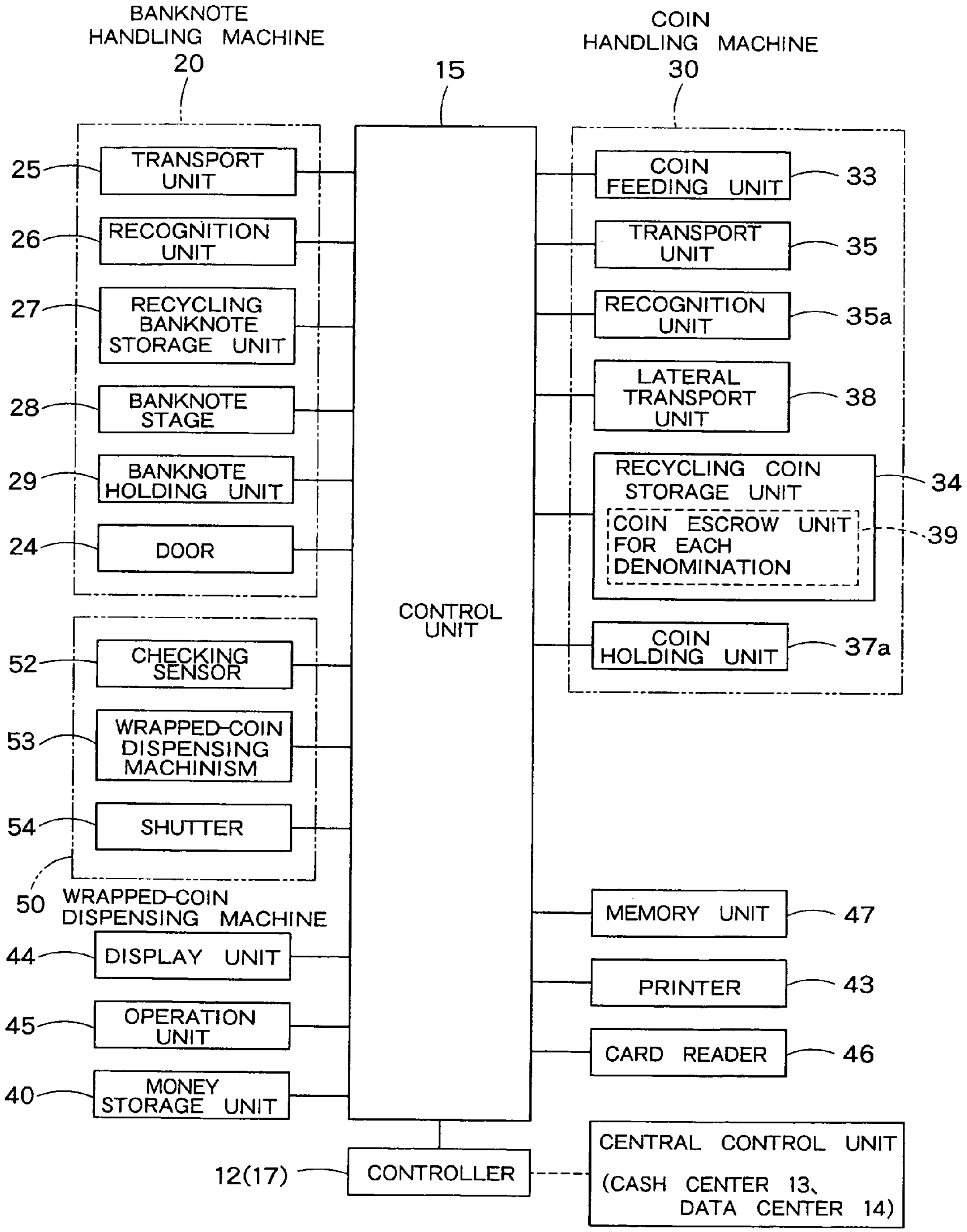
FIG. 4 is a block diagram illustrating a control system provided for the money handling machine shown in FIG. 2A or 2B.
Figure 5A:
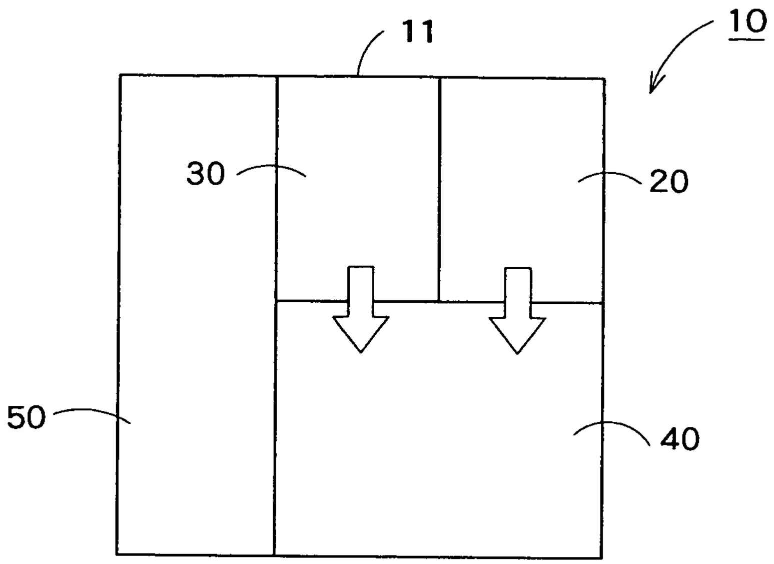
FIG. 5A is a diagram illustrating a series of operations for a money exchange process in the money handling machine shown in FIG. 2A or 2B.
Figure 5B:
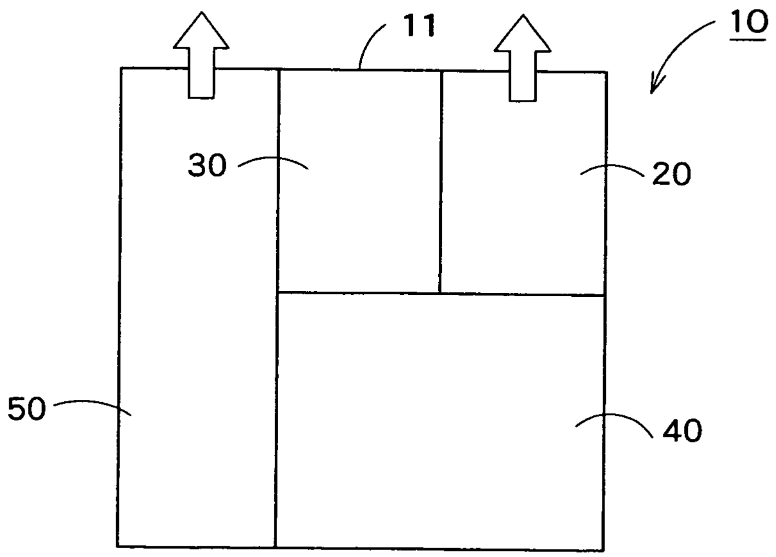
FIG. 5B is another diagram illustrating the series of operations for the money exchange process in the money handling machine shown in FIG. 2A or 2B.

The money handling machine related to this embodiment is adapted for performing a supplement process, a depositing process, a dispensing process, a delivery process, a mass delivery process, the money exchange process (including an exchange from large denomination to small denomination process and an exchange from small denomination to large denomination process), a checking process, a counting process and the like, about the money including the coins and banknotes. FIGS. 1 through 5 are provided herein for respectively illustrating the construction of the money handling system related to one exemplary embodiment of the present invention. Of these drawings, FIG. 1A shows one block diagram illustrating one exemplary construction of the money handling system of this embodiment, and FIG. 1B shows one block diagram illustrating another construction of the money handling system of this embodiment. FIG. 2A schematically shows the construction of the money handling machine provided to the money handling system shown in FIG. 1A or 1B, and FIG. 2B illustrates one exemplary perspective view of the money handling machine shown in FIG. 2A. FIG. 3A schematically shows the construction of the banknote handling machine provided to the money handling machine shown in FIG. 2A or 2B, and FIG. 3B schematically shows the construction of the coin handling machine provided to the money handling machine shown in FIG. 2A or 2B, and FIG. 3C schematically shows the construction of the wrapped-coin dispensing machine provided to the money handling machine shown in FIG. 2A or 2B. FIG. 4 shows one exemplary block diagram illustrating the control system provided for the money handling machine shown in FIG. 2A or 2B. FIG. 5 (including FIGS. 5A and 5B) is provided for illustrating the series of operations for the money exchange process in the money handling machine shown in FIG. 2A or 2B.

As shown in FIG. 1A, the money handling system of this embodiment includes a money handling machine 10 installed in the store, and a cash center 13 and a data center 14, which are respectively provided on the outside of the store, while being respectively isolated from the money handling machine 10. In addition, a central control unit is provided for each of the cash center 13 and data center 14. In this embodiment, each of the cash center 13 and data center 14 can serve as the central control unit. Meanwhile, a controller 12 is provided to the money handling machine 10. This controller 12 is connected, by wire or wireless communication, with the cash center 13, and thus capable of receiving and transmitting a signal relative to the cash center 13. Namely, this configuration can enable the remote control of the money handling machine 10 from the cash center 13 via the controller 12. In this case, the controller 12 may be a communication control device or another proper terminal, which is connected, via a LAN or the like means, with the money handling machine 10, or otherwise may be a communication unit or the like provided in the money handling machine 10.

Further, as shown in FIG. 1A, the cash center 13 and data center 14 are connected, by wire or wireless communication, relative to each other, such that various data can be received and transmitted between the cash center 13 and the data center 14. Therefore, the information, which has been transmitted to the cash center 13 from the money handling machine 10 via the controller 12, in regard to the handling condition of money including the coins, banknotes and the like in the money handling machine 10, can also be sent to the data center 14. In the present invention, the central control unit is provided to each of the cash center 13 and data center 14. However, the manner of providing the central control unit is not limited to this aspect. For instance, the central control unit may be provided to only the cash center 13, or otherwise may be provided to only the data center 14.

Further, the construction of the money handling system of this embodiment is not limited to such an aspect as shown in FIG. 1A. For instance, the money handling system may be constructed as illustrated in FIG. 1B. It is true that the construction of the money handling system shown in FIG. 1B is substantially the same as the construction of the money handling system shown in FIG. 1A, in that both of the two systems include the money handling machine 10, together with the cash center 13 and data center 14, which are respectively provided on the outside of the store, while being respectively isolated from the money handling machine 10. However, a controller 17 provided to the money handling machine 10 shown in FIG. 1B has a further expanded function.

Namely, this controller 17 is connected, by wire or wireless communication, with each of the cash center 13 and data center 14, and thus capable of receiving and transmitting the signal relative to both of the cash center 13 and data center 14.

In addition, still other functions can be provided to the controller 17 in the money handling system shown in FIG. 1B. For instance, this controller 17 can be further connected with a printer 17*a*, a card reader 17*b* and a scanner 17*c*. The printer 17*a* is provided for printing the information on the money including the coins, banknotes and the like, respectively handled by the money handling machine 10. The card reader 17*b* can be connected to the money handling machine 10, in addition to another card reader provided to the money handling machine 10, and is configured for reading ID information of an ID card carried by each operator. With this configuration, each operator can be identified, based on the signal related to the ID information of the operator inputted to the controller 17. The scanner 17*c* is configured to image a serial number, a bar-code or the like of each banknote. In this embodiment, the controller 17 may also serve as a router.

Furthermore, the controller 17 can also be connected with a personal computer 17*d* of the operator. In this case, the operator can operate the money handling machine 10 via the personal computer 17*d* connected with the controller 17. In addition, this personal computer 17*d* can serve to receive and transmit the signal relative to the data center 14 that will be described later.

Now, referring to FIGS. 2 through 4, the construction of the money handling machine 10 as shown in FIGS. 1A and 1B will be described in more detail.

As shown in FIGS. 2A and 2B, the money handling machine 10 includes a casing 11 having a substantially rectangular parallelepiped shape. In this casing 11, a wrapped-coin dispensing machine 50 is located on the left side, when seen from the front of the money handling machine 10, while a banknote handling machine 20 is located on the right side, in an upper portion, when seen from the front of the money handling machine 10, with a coin handling machine 30 located on the central, in the upper portion, when again seen from the front of the money handling machine 10. Further, in the casing 11 of the money handling machine 10, a money storage unit 40 configured for storing therein the coins and banknotes is provided below the banknote handling machine 20 and coin handling machine 30. In this case, the banknote handling machine 20 and coin handling machine 30 are respectively arranged to be controlled under one control authority (that will be herein referred to as the "first control authority") provided on the side of the store. Meanwhile, the money storage unit 40 and wrapped-coin dispensing machine 50 are respectively arranged to be controlled under another control authority (that will be herein referred to as the "second control authority") provided on the side of the designated collector.

Hereinafter, each component of the banknote handling machine 20, coin handling machine 30, money storage unit 40 and wrapped-coin dispensing machine 50 will be described in detail.

First of all, the construction of the money handling machine 20 will be described, with reference to FIGS. 2A, 2B and 3A. As shown in FIGS. 2B and 3A, the banknote handling machine 20 includes a banknote inlet 21 provided for taking the banknotes into the banknote handling machine 20, a banknote reject slot 22 provided for rejecting the counterfeit banknotes, the banknotes or the like that cannot be recognized or the like, among the banknotes respectively taken in the banknote handling machine 20, and a banknote return slot 23 provided for returning the banknotes that are not stored in the money storage unit 40, among the banknotes respectively taken in the banknote handling machine 20, to the exterior of the banknote handling machine 20. Further, as shown in FIG. 3A, a transport unit 25 is provided in the banknote handling machine 20. This transport unit 25 is adapted for transporting the banknotes respectively inserted through the banknote inlet 21, in the banknote handling machine 20.

The banknote inlet 21 is configured such that one banknote or plurality of banknotes in a batch form can be collectively inserted therethrough, by the operator, in the long-edge orientation. Further, as shown in FIG. 2B, a banknote stage 28 is provided to the banknote inlet 21. When in a waiting position, this banknote stage 28 is lifted to prevent the operator from inserting the banknotes through the banknote inlet 21. Meanwhile, when handling the banknotes, the banknote stage 28 takes a lowered position for allowing the operator to insert the banknote through the banknote inlet 21. As shown in FIG. 3A, the banknote inlet 21 is connected to the transport unit 25, such that one banknote or plurality of banknotes in the batch form, respectively inserted through the banknote inlet 21, can be transported, one by one, by the transport unit 25.

As shown in FIG. 3A, the banknote reject slot 22 is also connected to the transport unit 25, such that each banknote that has been recognized to be rejected, by a recognition unit (which will be described later), among the banknotes respectively taken in the banknote handling machine 20 via the banknote inlet 21, can be transported to the banknote reject slot 22 by the transport unit 25. Thus, the operator can take out such banknotes respectively fed to the banknote reject slot 22. It is noted that this banknote reject slot 22 can also serve as an outlet for dispensing the changes or the like. Additionally, a cover (not shown) is provided to the banknote reject slot 22. This cover is opened when waiting, while being closed when handling the banknotes or the like.

Further, as shown in FIG. 3A, a banknote holding unit 29 is provided to the banknote return slot 23, while being connected to the transport unit 25. This banknote holding unit 29 is configured to receive the banknotes respectively transported thereto by the transport unit 25. Further, a door 24 that can be opened and closed is provided to the banknote return slot 23. When the banknotes held in the banknote holding unit 29 are returned, one side wall of the banknote holding unit 29 on the front face side of the banknote handling machine 20 is opened, thereby allowing the operator to take out the banknotes via the opened door 24. In this case, the door 24 can be automatically opened, when the banknotes are brought into such a state that can allow the banknotes to be taken out from the banknote return slot 23. In some cases, as will be described later, rather than being taken out, by the operator, from the banknote return slot 23, the banknotes held in the banknote holding unit 29 are further fed to a banknote storage cassette 41 (which will be described later) arranged in the banknote storage unit 40.

The transport unit 25 can serve to transport the banknotes, one by one, in succession, in the banknote handling machine 20. More specifically, the transport unit 25 is configured for transporting the banknotes along a transport path, while each banknote is held between a pair of belts. As shown in FIG. 3A, the transport path provided to the transport unit 25 is diverted at various points, with a diverter (not shown) provided at each diversion point of the transport path. For instance, each diverter is composed of a diverting nail, and is controlled by a control unit 15 that will be described later. Specifically, as shown in FIG. 3A, the transport unit 25 is provided for transporting each banknote inserted through the banknote inlet 21 to the banknote reject slot 22, banknote holding unit 29 or recycling banknote storage unit 27 that will be described later. Further, the transport unit 25 can serve to transport each banknote temporarily stored in the recycling banknote storage unit 27 to the banknote reject slot 22 and/or banknote holding unit 29.

In addition, as shown in FIG. 3A, the recognition unit 26 is provided to the transport unit 25. This recognition unit 26 can serve to recognize each banknote transported by the transport unit 25, one by one, about the denomination, authenticity, fitness or the like thereof. More specifically, the recognition unit 26 includes magnetic sensors and/or optical sensors, each adapted for recognizing the banknotes, one by one, about the denomination, authenticity or the like thereof. In this case, the recognition result on each banknote recognized by the recognition unit 26 will be transmitted to the control unit 15 that will be described later.

In this embodiment, a plurality of (e.g., three) recycling banknote storage units 27 are arranged, in parallel, in the banknote handling machine 20. In general, each of such recycling banknote storage units 27*a* to 27*c* is provided for each corresponding denomination of the banknotes. For instance, in the case Japanese banknotes are handled by the banknote handling machine 20, one-thousand-yen banknotes, five-thousand-yen banknotes and ten-thousand-yen banknotes are stored in the recycling banknote storage units 27*a* to 27*c*, respectively. In some cases, two-thousand-yen banknotes and five-thousand-yen banknotes are stored, in a mixed state, in the recycling banknote storage unit 27*b*. Alternatively, in the case dollar banknotes (e.g., one-dollar banknotes, two-dollar banknotes, five-dollar banknotes, ten-dollar banknotes, twenty-dollar banknotes, fifty-dollar banknotes, one-hundred-dollar banknotes and the like) and/or yuan banknotes (e.g., one-yuan banknotes, five-yuan banknotes, ten-yuan banknotes, twenty-yuan banknotes, fifty-yuan banknotes, one-hundred-yuan banknotes and the like) are handled by the banknote handling machine 20, more than three denominations are related to such banknotes or currency. Therefore, in this case, it is necessary to increase the number of the recycling banknote storage units 27 or otherwise to limit the denominations of the banknotes to be stored in the respective recycling banknote storage units 27. Further, as shown in FIG. 3A, each recycling banknote storage unit 27 includes a drum 27*p* that can be rotated in both of forward and backward directions, with a pair of tapes being wound around the drum 27*p*. With this configuration, the banknotes fed to each recycling banknote storage unit 27 from the transport unit 25 will be wound around the corresponding drum 27*p*, successively, one by one, while being held between the pair of tapes.

More specifically, each drum 27*p* is configured to be rotated in both of clockwise and anticlockwise directions in FIG. 3A, about one axis vertical to the sheet of FIG. 3A. Each end of the pair of tapes is attached at the same point on the outer circumferential face of each drum 27*p*. Thus, such a pair of tapes can be wound together around each drum 27*p* when the drum 27*p* is rotated in the anticlockwise direction in FIG. 3A. In this case, the operation of each drum 27*p* is controlled by the control unit 15 that will be described later. Thus, the banknotes fed to each recycling banknote storage unit 27 from the transport unit 25 can be wound, one by one, around each corresponding drum 27*p*, together with the pair of tapes, while being held between the pair of tapes, along with the rotation of the drum 27*p* in the anticlockwise direction in FIG. 3A. In this way, the plurality of banknotes can be wound, one by one, with a proper interval, around each corresponding drum 27*p*. Meanwhile, when each drum 27*p* is rotated in the clockwise direction in FIG. 3A, the pair of tapes wound around this drum 27*p* will be released therefrom, and thus each banknote stored in the corresponding recycling banknote storage unit 27 will be fed to the transport unit 25.

It is noted that each recycling banknote storage unit 27 is not limited to such an aspect as described above, in which this storage unit 27 is composed of the drum and pair of tapes, such that each banknote can be wound around the drum, together with the pair of tapes, while being held therebetween. For instance, each recycling banknote storage unit 27 may be provided as a stacker-type storage unit.

As described above, the banknote holding unit 29 is provided in the banknote return slot 23, while being connected to the transport unit 25, as shown in FIG. 3A. This banknote holding unit 29 is configured to receive each banknote inserted through the banknote inlet 21 and/or receive each banknote once stored in each recycling banknote storage unit 27 and then fed thereto by the transport unit 25. Further, this banknote holding unit 29 is configured to hold therein the plurality of banknotes, in the batch form, while such banknotes are respectively fed thereto from the transport unit 25. As described above, when the banknotes held in the banknote holding unit 29 are returned, the side wall of the banknote holding unit 29 on the front face side of the banknote handling machine 20 is opened, thereby allowing the operator to take out the banknotes via the door 24. In this case, the door 24 can be automatically opened, when the banknotes are brought into the state that can allow the banknotes to be taken out from the banknote return slot 23. Meanwhile, when the banknotes are held in the banknote holding unit 29, the banknotes are placed on a temporary holding plate. Further, when the banknotes held in the banknote holding unit 29 are fed to and stored in the banknote storage cassette 41, a stage provided to the banknote storage cassette 41 is moved toward the banknotes placed on the temporary holding plate of the banknote holding unit 29, and then lowered toward the banknote storage cassette 41 from the banknote holding unit 29, with the banknotes transferred and placed on the stage. Thus, the banknotes can be stored in the banknote storage cassette 41, such that the banknotes on the stage are pushed from above by a holding member.

Next, referring to FIGS. 2A, 2B and 3B, the construction of the coin handling machine 30 will be described. As shown in FIGS. 2B and 3B, the coin handling machine 30 includes a coin inlet 31 provided for taking the coins into the coin handling machine 30, and a coin return slot 32 provided for rejecting the coins that cannot be recognized by a recognition unit 35*a* (which will be described later), among the coins respectively taken in the coin handling machine 30; as well as for returning the coins that are not stored in the money storage unit 40, among the coins respectively taken in the coin handling machine 30, to the exterior of the coin handling machine 30. Further, as shown in FIG. 3B, a transport unit 35 is provided in the coin handling machine 30. This transport unit 35 is adapted for transporting the coins respectively inserted through the coin inlet 31, in the coin handling machine 30.

The coin inlet 31 is configured such that one or more coins can be collectively inserted therethrough. Then, the coins respectively inserted through the coin inlet 31 are fed to the interior of the coin handling machine 30.

The coin return slot 32 is connected to a downstream end of the transport unit 35, and is configured for accumulating therein the coins respectively transported from the transport unit 35. Thus, the operator can take out the coins accumulated in the coin return slot 32. As described above, this coin return slot 32 is provided for receiving the coins or the like that cannot be recognized by the recognition unit 35*a* (which will be described later), among the coins respectively taken in the coin handling machine 30, as well as for receiving the coins that are not stored in the money storage unit 40, among the coins respectively taken in the coin handling machine 30. Thereafter, such coins will be returned to the exterior of the coin handling machine 30, via the coin return slot 32.

As shown in FIG. 3B, a coin feeding unit 33 is provided in the coin handling machine 30. This coin feeding unit 33 is communicated with the coin inlet 31, and is configured for temporarily accumulating therein the coins respectively inserted by the operator through the coin inlet 31, as well as for feeding out such accumulated coins to the transport unit 35 that will be described later. Further, a rotary disk (not shown) adapted for feeding out the coins is provided to the coin feeding unit 33, such that the coins can be fed out, one by one, by this rotary disk, toward the transport unit 35.

The transport unit 35 can serve to transport the coins, one by one, in succession, in the coin handling machine 30. More specifically, this transport unit 35 can transport the coins, one by one, by using a coin transport belt (not shown), while each coin is standing on the belt, in a slightly oblique state, with an appropriate interval. As shown in FIG. 3B, an upstream end and the downstream end of the transport unit 35 are connected with the coin feeding unit 33 and coin return slot 32, respectively.

Further, as shown in FIG. 3B, the recognition unit 35*a* is provided to the transport unit 35. The recognition unit 35*a* can serve to recognize the coins, one by one, while each coin is transported by the transport unit 35. Specifically, this recognition unit 35*a* is configured for recognizing the denomination, authenticity or the like of each coin transported along the transport unit 35. More specifically, the recognition unit 35*a* includes magnetic sensors and/or optical sensors, each adapted for recognizing the coins, one by one, about the denomination, authenticity or the like thereof. In this case, the recognition result on each coin recognized by the recognition unit 35*a* will be transmitted to the control unit 15 that will be described later.

In this embodiment, a plurality of (e.g., six) cylindrical recycling coin storage units 34 are arranged, in parallel, in the coin handling machine 30, and each recycling coin storage unit 34 is configured for taking in and taking out the coins from the top thereof. Further, each recycling coin storage unit 34 is provided to extend in the vertical direction in the coin handling machine 30. In general, each of such recycling banknote storage units 34*a* to 34*f* is provided for each corresponding denomination of the coins. For instance, in the case Japanese coins are handled by the coin handling machine 30, one-yen coins, five-yen coins, ten-yen coins, fifty-yen coins, one-hundred-yen coins and five-hundred-yen coins are stored in the recycling coin storage units 34*a* to 34*f*, respectively. Alternatively, in the case US coins (e.g., one-cent coins, five-cent coins, ten-cent coins, twenty-five cent coins, fifty-cent coins, one-dollar coins and the like) and/or Chinese coins (e.g., one-fen coins, two-fen coins, five-fen coins, one-jiao coins, five-jiao coins, one-yuan coins and the like) are handled by the coin handling machine 30, the recycling coin storage units 34 should be provided, in a number corresponding to the denominations of such coins or currency. In any case, the coins are stored, in a stacked condition, in each recycling coin storage unit 34.

As shown in FIG. 3B, seven sorting holes 36 are provided, in a middle part of the transport unit 35, while being arranged, with a given interval, from the coin feeding unit 33 toward the downstream side of the transport unit 35. In this case, the sorting hole 36 (or overflowing sorting hole 36) located on the most upstream side, among the seven sorting holes 36, is provided for feeding the coins, directly, from the transport unit 35, to a lateral transport unit 38 that will be described later. More specifically, this sorting hole 36 located on the most upstream side can serve to feed the coins, directly, onto the lateral transport unit 38, when the recognition result on the coin recognized by the recognition unit 35*a* satisfies a predetermined condition (e.g., when a certain recycling coin storage unit 34 corresponding to the denomination of the coin recognized by the recognition unit 35*a* is completely filled with the coins). Meanwhile, each of the second to seventh sorting holes 36, respectively arranged from the upstream side, is provided, corresponding to each of the recycling coin storage units 34*a* to 34*f*.

As shown in FIG. 3B, a coin escrow unit 39 for each denomination, which is adapted for escrowing (or temporarily holding) therein the coins, is provided to a top portion of each recycling coin storage unit 34 extending in the vertical direction. With this configuration, the coins, respectively, falling down from the transport unit 35 through each sorting hole 36, are first escrowed in the coin escrow unit 39. For example, this coin escrow unit 39 is configured for escrowing therein approximately ten coins, for each denomination. Thereafter, the coins respectively escrowed in this coin escrow unit 39 will be stored in each corresponding recycling coin storage unit 34. Further, in this case, the coin escrow unit 39 includes a releasing member. Namely, due to this releasing member, the coins respectively escrowed in the coin escrow unit 39 for each denomination, can also be released onto the lateral transport unit 38 that will be described later.

Meanwhile, in the case the coins stored in each corresponding recycling coin storage unit 34 are taken out therefrom, a stage (not shown) provided at a bottom portion of the recycling coin storage unit 34 is lifted upward, and then the coins placed on the stage are fed toward the coin escrow unit 39 for each denomination. Thereafter, such coins fed to the coin escrow unit 39 are released onto the lateral transport unit 38 by the releasing member of the coin escrow unit 39.

Further, as shown in FIG. 3B, a coin holding unit 37*a* is provided in the coin handling machine 30, with a chute 37*b* provided above the coin holding unit 37*a*. With this configuration, the coins fed to a top portion of the chute 37*b* from the lateral transport unit 38 that will be described later can be fed to the coin holding unit 37*a* through the chute 37*b*. Thereafter, the coins temporarily held in the coin holding unit 37*a* can be further fed to a coin storage cassette 42 (that will be described later) located in the money storage unit 40.

Additionally, in the coin handling machine 30, as shown in FIG. 3B, the lateral transport unit 38 having, for example, a circular belt 38*a* extending in a substantially horizontal direction, is provided in the vicinity of the recycling coin storage units 34 respectively extending in the vertical direction. The circular belt 38*a* is provided over two pulleys, each positioned at the same level. As such, the circular belt 38*a* can be circulated in either of the clockwise and anticlockwise directions in FIG. 3B, with the rotation of one of the two pulleys in either of the forward and backward directions. One end of the lateral transport unit 38 is positioned in the coin feeding unit 33, while the other end of the lateral transport unit 38 is positioned in the vicinity of the top portion of the chute 37*b*. As described above, the circular belt 38*a* of the lateral transport unit 38 can be rotated in either of the forward and backward directions. Therefore, when the circular belt 38*a* is rotated in the anticlockwise direction in FIG. 3B, the coins present on the lateral transport unit 38 will be fed to the coin feeding unit 33. Meanwhile, when the circular belt 38*a* is rotated in the clockwise direction in FIG. 3B, the coins present on the lateral transport unit 38 will be fed to the chute 37*b*, and thus eventually held in the coin holding unit 37*a*.

Now, referring to FIGS. 2A and 2B, the construction of the money storage unit 40 will be described. As shown in FIGS. 2A and 2B, the money storage unit 40 is provided in the lower part of the casing 11 of the money handling machine 10. Further, as shown in FIGS. 3A and 3B, the money storage unit 40 includes the banknote storage cassette 41 provided for storing therein the banknotes and the coin storage cassette 42 provided for storing therein the coins. More specifically, the banknote storage cassette 41 is configured for storing therein the banknotes once held in the banknote holding unit 29 of the banknote handling machine 20 (see FIG. 3A). Meanwhile, the coin storage cassette 42 is configured for storing therein the coins once held in the coin holding unit 37*a* of the coin handling machine 30 (see FIG. 3B). With this configuration, each of the cassettes 41, 42 of the money storage unit 40 can be drawn out, forward, from the casing 11, by the designated collector in charge of collecting the sales proceeds, such as the staff or the like of the armored car company. In this manner, each cassette 41, 42, itself, can be collected by the designated collector.

Next, referring to FIGS. 2A, 2B and 3C, the construction of the wrapped-coin dispensing machine 50 will be described. As shown in FIGS. 2B and 3C, the wrapped-coin dispensing machine 50 includes a plurality of (e.g., seven) wrapped-coin storage cassettes (or wrapped-coin storage units) 51*a* to 51*g* provided in the casing 11, each configured for storing therein the wrapped-coins, for each denomination. Then, this wrapped-coin dispensing machine 50 can serve to dispense therefrom the wrapped coins stored in each of the wrapped-coin storage cassettes 51*a* to 51*g*, for each denomination, to the exterior of the casing 11.

More specifically, the wrapped-coin dispensing machine 50 includes the plurality of (e.g., seven) wrapped-coin storage cassettes 51*a* to 51*g*, each configured for storing therein the wrapped-coins, for each denomination, and a wrapped-coin dispensing mechanism 53 configured for receiving the wrapped coins, respectively fed, one by one, from each of the wrapped-coin storage cassettes 51*a* to 51*g*. In this embodiment, the operator can fill, by hand, as needed, any one of the wrapped-coin storage cassettes 51*a* to 51*g* with the wrapped coins. More specifically, each storage cassette 51*a* to 51*g* is configured to store therein the plurality of wrapped coins, with the longitudinal direction of each wrapped coin being normal to the sheet of FIG. 3C. Namely, each circle as depicted in FIG. 3C denotes a cross section of each wrapped coin, which is stored in each storage cassette 51*a* to 51*g* and extending vertically to the sheet of FIG. 3C. Further, as shown in FIG. 3C, each storage cassette 51*a* to 51*g* is inclined, slightly downward, toward the wrapped-coin dispensing mechanism 53. As such, each wrapped coin stored in each storage cassette 51*a* to 51*g* can be moved, by dead load (or its weight), toward the wrapped-coin dispensing mechanism 53.

As described above, the wrapped-coin dispensing mechanism 53 is provided for receiving the wrapped coins, respectively fed, one by one, from each of the wrapped-coin storage cassettes 51*a* to 51*g*. As shown in FIG. 3C, the wrapped-coin dispensing mechanism 53 can be lifted or lowered. As such, this wrapped-coin dispensing mechanism 53 can be moved to any suitable level corresponding to a right end of each storage cassette 51*a* to 51*g*, in order to receive the wrapped coins therefrom. More specifically, a timing belt (not shown) is provided, to the wrapped-coin dispensing mechanism 53, such that the wrapped-coin dispensing mechanism 53 can be lifted or lowered by actuation of this timing belt.

In addition, a checking sensor 52 is provided for each storage cassette 51*a* to 51*g*, such that this checking sensor 52 can be moved, in a substantially lateral direction along the storage cassettes 51*a* to 51*g*, as shown in FIG. 3C. In this way, the checking sensor 52 can serve to recognize each wrapped coin stored in each storage cassette 51*a* to 51*g*, about the denomination or the like thereof, as well as to check the number of the wrapped coins respectively stored in each storage cassette 51*a* to 51*g*.

Further, as shown in FIG. 3C, a shutter 54 is located above the wrapped-coin dispensing mechanism 53. This shutter 54 is usually closed, and it can be opened, when the operator sends a command for opening this shutter to the control unit 15 from an operation unit 45 and when the wrapped-coin dispensing mechanism 53 reaches the highest position thereof. Thus, the operator can take out the wrapped coins stored in the wrapped-coin dispensing mechanism 53.

Next, other various mechanisms provided in the money handling machine 10 will be described. As shown in FIG. 2B, the operation unit 45 adapted for allowing the operator to input various commands to the control unit 15 (that will be described later) of the money handling machine 10, and a display unit 44 adapted for displaying the handling condition of money or the like in the money handling machine 10 are respectively provided to a top face of the casing 11 of the money handling machine 10. The operation unit 45 includes, for example, numeric keys, a confirmation key, a start key, a clear (or cancelling) key, a reset key and the like. Thus, by pushing such keys, the operator can input the various commands to the control unit 15 of the money handling machine 10. For instance, the display unit 44 is composed of a liquid crystal display (LCD) device.

Further, a printer 43 adapted for printing the contents or the like of handling the money in the money handling machine 10, and a card reader 46 adapted for checking the authority of the operator to operate the money handling machine 10 are respectively provided to a front face of the casing 11. For instance, the card reader 46 can serve to read the ID information of the ID card carried by each operator.

Now, referring to FIG. 4, the control unit 15 adapted for controlling each component of the money handling machine 10 will be described. This control unit 15 is provided in the casing 11 of the money handling machine 10.

As shown in FIG. 4, the control unit 15 is connected with each component of the banknote handling machine 20 (e.g., the transport unit 25, recognition unit 26, recycling banknote storage units 27, banknote stage 28, banknote holding unit 29, door 24 and the like), each component of the coin handling machine 30 (e.g., the coin feeding unit 33, transport unit 35, recognition unit 35*a*, lateral transport unit 38, recycling coin storage units 34 including the coin escrow unit 39 for each denomination, coin holding unit 37*a* and the like), money storage unit 40 and each component of the wrapped-coin dispensing machine 50 (e.g., the checking unit 52, wrapped-coin dispensing mechanism 53, and shutter 54), as well as connected with the display unit 44, operation unit 45, printer 43, card reader 46, memory unit 47 and the like. Further, the control unit 15 is connected with the controller 12 (17) via an interface.

The control unit 15 is configured for receiving the recognition result on each banknote recognized by the recognition unit 26 of the banknote handling machine 20, as well as for receiving the recognition result on each coin recognized by the recognition unit 35*a* of the coin handling machine 30. Further, the control unit 15 can serve to receive the information, such as the ID information or the like on the operator, inputted via the operation unit 45 or read by the card reader 46 from each card. In addition, this control unit 15 is configured for receiving the information on the number of the wrapped coins stored in each wrapped-coin storage cassette 51*a* to 51*g* or the like checked by the checking sensor 52.

When the money handling machine 10 is operated, the controller 15 checks the authority of the operator, based on the ID information on the operator, inputted from the operation unit 45 and/or card reader 46. Further, the controller 15 can serve to control each component of the banknote handling machine 20, coin handling machine 30 and/or wrapped-coin dispensing machine 50, as well as to control the display unit 44, printer 43 and the like.

The cash center 13 or data center 14 is configured to transmit a command signal indicative of each process to be performed by the money handling machine 10, to the money handling machine 10, via the controller 12 (17). More specifically, the signal transmitted from the cash center 13 to the money handling machine 10 is related to at least one of a closing command, a delivery command, a collection by staff command, a depositing command, a dispensing command, a supplement command, a checking command, an exchange from large denomination to small denomination command, an exchange from small denomination to large denomination command, a counting command, a reset command, a confirmation command, a start command, an unlocking command and a program download command.

Further, the cash center 13 or data center 14 is configured to receive a signal indicative of information on the handling condition of the money in the money handling machine 10, from the money handling machine 10, via the controller 12 (17). More specifically, the signal received by the data center 14 from the money handling machine 10 is related to at least one of closing data, delivery data, collection by staff data, total amount money data of the recycling money storage unit, depositing data, dispensing data, supplement data, checking data, exchange from large denomination to small denomination data, exchange from small denomination to large denomination data, counting data, total amount money data of the system, system data, failure data and program data.

In this embodiment, the cash center 13 or data center 14 can serve to transmit and receive the signal relative to each of the banknote handling machine 20, coin handling machine 30, money storage unit 40 and wrapped-coin dispensing machine 50, in the money handling machine 10, via the controller 12 (17) and control unit 15.

Next, the operation of the money handling machine 10 constructed as described above will be discussed.

The operation of the money handling machine 10 includes three modes, i.e., an interface confirmation mode, an operation mode and a maintenance mode. In this embodiment, the operator can select each of the interface confirmation mode, operation mode and maintenance mode, via the operation unit 45.

The interface confirmation mode is provided for checking whether or not the money handling machine 10 is connected with a higher-ranking machine or the like via an interface 16, in an initial state of the money handling machine 10 or when starting the money handling machine 10. In this interface confirmation mode, if the money handling machine 10 is connected, for communication, with the higher-ranking machine or the like via the interface 16, various setting data can be transmitted to the money handling machine 10 from the higher-ranking machine or the like.

The operation mode includes two modes, i.e., an on-line mode in which the money handling machine 10 is connected, for communication, with the higher-ranking machine or the like, and an off-line mode in which the connection, for communication, between the money handling machine 10 and any external machine is shut off. Further, the on-line mode includes two modes, i.e., an opening-store mode and a closing-store mode. In the opening-store mode, the operator can perform the supplement process, depositing process, dispensing process, delivery process, mass delivery process, exchange from large denomination to small denomination process, exchange from small denomination to large denomination process, checking process, counting process and the like. Further, in the opening-store mode, each cassette 41, 42, itself, of the money storage unit 40 can be collected by the designated collector in charge of collecting the sales proceeds, such as the staff or the like of the armored car company. Meanwhile, in the closing-store mode, only the collection of each cassette 41, 42 of the money storage unit 40 performed by the designated collector can be done. If required, such opening-store mode and closing-store mode may be switched from each other for specific time periods. Meanwhile, in the off-line mode, no information is transmitted to and from the higher-ranking machine, and the result of each process, e.g., the depositing process or the like, is stored in the memory unit 47 provided to the money handling machine 10. In this case, the operator can select each of the aforementioned modes via the operation unit 45.

During the maintenance mode, a person in charge of the maintenance for the money handling machine 10 serves to maintain the money handling machine 20, coin handling machine 30 and/or wrapped-coin dispensing machine 50 of the money handling machine 10. Such maintenance may be carried out in a site or place where the money handling machine 10 is installed, or otherwise may be conducted after the money handling machine 10 is carried to a factory or the like.

Now, the supplement process, depositing process, dispensing process, delivery process, mass delivery process, exchange from large denomination to small denomination process, exchange from small denomination to large denomination process, checking process, counting process, and closing process and collection by staff process will be described, respectively. Each of these processes is performed by actuation of each component controlled by the control unit 15. Further, as will be described later, each of the supplement process, depositing process, dispensing process, delivery process, mass delivery process, exchange from large denomination to small denomination process, exchange from small denomination to large denomination process, checking process, counting process, closing process and collection by staff process is performed, based on each corresponding command inputted to the control unit 15 by the operator via the operation unit 45, or otherwise performed, in accordance with each corresponding command given to the control unit 15 from the cash center 13 or data center 14 via the controller 12 (17).

(Supplement Process)

First of all, the supplement process for the banknotes and/or coins will be described in brief. The supplement process for the banknotes and/or coins is provided for supplementing each recycling banknote storage unit 27 of the banknote handling machine 20 with the banknotes for each denomination and/or supplementing each recycling coin storage unit 34 of the coin handling machine 30 with the coins for each denomination.

(Depositing Process)

Next, the depositing process for the banknotes and/or coins will be described in brief. This depositing process includes two modes, i.e., a mode with the delivery process and another mode without the delivery process. The depositing process in the mode with the delivery process is provided for depositing the money into the money handling machine 10, with the delivery process performed in succession to this depositing process. More specifically, in this mode, the banknotes are temporarily held in each corresponding recycling banknote storage unit 27, and then held in the banknote holding unit 29, and finally stored in the banknote storage cassette 41. Further, in this mode, the coins are escrowed in the coin escrow unit 39 for each denomination, and then held in the coin holding unit 37*a*, and finally stored in the coin storage cassette 42. Meanwhile, the depositing process in the mode without the delivery process is provided for only depositing the money into the money handling machine 10. Namely, in this mode, if required after the depositing process, the delivery process (that will be described later) for delivering the money to the money storage unit 40 is performed, independently of the depositing process. In this embodiment, the mode with the delivery process or mode without the delivery process can be set during the installment of the money handling machine 10.

(Dispensing Process)

Next, the dispensing process for the banknotes and/or coins will be described in brief. The dispensing process for the banknotes and/or coins is provided for dispensing the banknotes stored in each recycling banknote storage unit 27 of the banknote handling machine 20 to the exterior of the banknote handling machine 20, and/or dispensing the coins stored in each recycling coin storage unit 34 of the coin handling machine 30 to the exterior of the coin handling machine 30.

In addition, as the dispensing process, another process for dispensing the wrapped coins stored in each storage cassette 51*a* to 51*g* of the wrapped-coin dispensing machine 50 to the exterior of this wrapped-coin dispensing machine 50 can be mentioned. In the case the wrapped coins stored in each storage cassette 51*a* to 51*g* of the wrapped-coin dispensing machine 50 is dispensed from the wrapped-coin dispensing machine 50, the control authority, under which such wrapped coins are controlled, is changed from the second control authority (i.e., the control authority provided on the side of the designated collector) to the first control authority (i.e., the control authority provided on the side of the store). Further, in this case, the total amount of money corresponding to the wrapped coins dispensed from the wrapped-coin dispensing machine 50 is deposited into an account of the financial institution related to the designated collector, from another account of the financial institution related to the store. Namely, from a viewpoint of the store, while the cash of the wrapped coins is dispensed from the wrapped-coin dispensing machine 50, the total amount of money corresponding to such dispensed wrapped coins will be deducted from the account of the financial institution related to the store.

(Delivery Process)

Next, the delivery process for the banknotes and/or coins will be described. Herein, the delivery process for the banknotes and/or coins is provided for delivering the banknotes stored in each recycling banknote storage unit 27 of the banknote handling machine 20 to the banknote storage cassette 41 of the money storage unit 40, and/or delivering the coins stored in each recycling coin storage unit 34 of the coin handling machine 30 to the coin storage cassette 42 of the money storage unit 40. Once the delivery process is performed, the control authority, under which the banknotes and/or coins, respectively fed from each recycling banknote storage unit 27 and/or each recycling coin storage unit 34 to the money storage unit 40, are controlled, is changed from the first control authority (i.e., the control authority provided on the side of the store) to the second control authority (i.e., the control authority provided on the side of the designated collector). As a result, the total amount of money of the banknotes and/or coins, respectively stored in each recycling banknote storage unit 27 and/or each recycling coin storage unit 34, is reduced by the total amount of money of the banknotes and/or coins, respectively subjected to the delivery process. Meanwhile, the total amount of money of the banknotes and/or coins, respectively stored in the banknote storage cassette 41 and/or coin storage cassette 42 of the money storage unit 40, is increased by the total amount of money of the banknotes and/or coins, respectively subjected to the delivery process.

In the delivery process as described above, once the banknotes and/or coins, respectively stored in each recycling banknote storage unit 27 and/or each recycling coin storage unit 34, are fed to the money storage unit 40, the total amount of money corresponding to such banknotes and/or coins will be deposited into the account of the financial institution related to the store, from the account of the financial institution related to the designated collector. Namely, from the viewpoint of the store, while the cash of the banknotes and/or coins fed to the money storage unit 40 is lost, the total amount of money corresponding to such banknotes and/or coins, respectively fed to the money storage unit 40, will be deposited into the account of the financial institution related to the store.

(Mass Delivery Process)

Now, the mass delivery process for the banknotes and/or coins will be described in brief. Herein, the mass delivery process for the banknotes and/or coins is provided for delivering the banknotes, in a relatively great amount, to the banknote storage cassette 41 of the money handling machine 40, and/or delivering the coins, in a relatively great amount, to the coin storage cassette 42 of the money handling machine 40. In this mass delivery process, similar to the aforementioned delivery process, the control authority, under which the banknotes and/or coins, respectively fed from the banknote handling machine 20 and/or coin handling machine 30 to the money storage unit 40, are controlled, is changed from the first control authority (i.e., the control authority provided on the side of the store) to the second control authority (i.e., the control authority provided on the side of the designated collector). Again, in this case, the total amount of money corresponding to such banknotes and/or coins, respectively fed to the money storage unit 40, will be deposited into the account of the financial institution related to the store, from the account of the financial institution related to the designated collector.

(Exchange from Large Denomination to Small Denomination Process, and Exchange from Small Denomination to Large Denomination Process)

Next, the exchange from large denomination to small denomination process and the exchange from small denomination to large denomination process will be described. Herein, the exchange from large denomination to small denomination process and the exchange from small denomination to large denomination process are respectively provided for once taking the banknotes and/or coins into the banknote handling machine 20 and/or coin handling machine 30, and then returning the banknotes and/or coins, which are respectively corresponding to the total amount of money of the banknotes and/or coins once taken in the banknote handling machine 20 and/or coin handling machine 30, while being different in one or more denominations of money therefrom, to the exterior of the banknote handling machine 20 and/or coin handling machine 30.

Further, the above exchange from large denomination to small denomination process and/or exchange from small denomination to large denomination process may be provided for first taking the banknotes and/or coins into the banknote handling machine 20 and/or coin handling machine 30, and then dispensing the wrapped coins from the wrapped-coin dispensing machine 50. More specifically, the wrapped coins the amount of which is calculated by subtracting a charge for the service from the total amount of money of the banknotes and/or coins, respectively taken in the banknote handling machine 20 and/or coin handling machine 30, or otherwise the wrapped coins the amount of which corresponds to the total amount of money of the banknotes and/or coins, respectively taken in the banknote handling machine 20 and/or coin handling machine 30, are dispensed from the wrapped-coin dispensing machine 50. Further in this case, the banknotes temporarily stored in the recycling banknote storage units 27 of the banknote handling machine 20 may be dispensed from the banknote handling machine 20, while the wrapped coins are dispensed from the wrapped-coin dispensing machine 50. Alternatively or additionally, the loose coins may be dispensed from the coin handling machine 30, during the above exchange from large denomination to small denomination process and/or upon the exchange from small denomination to large denomination process.

More specifically, once the command for performing such a money exchange process as described above is inputted to the control unit 15 by the operator via the operation unit 45, or otherwise the command for performing the money exchange process is given to the control unit 15 from the cash center 13 or data center 14 via the controller 12 (17), the control unit 15 of the money handling machine 10 serves to deliver the banknotes and/or coins, respectively deposited in the banknote handling machine 20 and/or coin handling machine 30, to the money storage unit 40, as shown in FIG. 5A. In this case, the control authority, under which the banknotes and/or coins, respectively delivered from the banknote handling machine 20 and/or coin handling machine 30 to the money storage unit 40, are controlled, is changed from the first control authority (i.e., the control authority provided on the side of the store) to the second control authority (i.e., the control authority provided on the side of the designated collector).

Thereafter, as shown in FIG. 5B, the control unit 15 controls the wrapped-coin dispensing machine 50 to dispense therefrom the wrapped coins, as the exchange money. In this case, the control authority, under which the wrapped coins, respectively dispensed from the wrapped-coin dispensing machine 50, are controlled, is changed from the second control authority (i.e., the control authority provided on the side of the designated collector) to the first control authority (i.e., the control authority provided on the side of the store). Alternatively or additionally, while controlling the wrapped-coin dispensing machine 50 to dispense therefrom the wrapped coins, the control unit 15 may control the banknote handling machine 20 to dispense therefrom the banknotes temporarily stored in the recycling banknote storage units 27 of the banknote handling machine 20 (see FIG. 5B). Further, the control unit 15 may serve to perform the dispensing process for dispensing the loose coins from the coin handling machine 30. In any case, the control unit 15 will transmit the information on such a money exchange process to the cash center 13 and/or data center 14 via the controller 12 (17).

In the case of dispensing the wrapped coins from the wrapped-coin dispensing machine 50 in the above exchange from large denomination to small denomination process and/or exchange from small denomination to large denomination process, the following operation may be performed. For instance, when the command for performing the money exchange process is sent to the control unit 15 by the operator via the operation unit 45, or when the command for performing the money exchange process is given to the control unit 15 from the cash center 13 or data center 14 via the controller 12 (17), the control unit 15 of the money handling machine 10 serves to deliver the banknotes and/or coins, respectively deposited in the banknote handling machine 20 and/or coin handling machine 30, to the money storage unit 40, as shown in FIG. 5A. In this case, the control authority, under which the banknotes and/or coins, respectively delivered from the banknote handling machine 20 and/or coin handling machine 30 to the money storage unit 40, are controlled, is changed from the first control authority (i.e., the control authority provided on the side of the store) to the second control authority (i.e., the control authority provided on the side of the designated collector).

Thereafter, the control unit 15 will transmit the information on this delivery process (storage process) to the cash center 13 and/or data center 14 via the controller 12 (17). Then, the cash center 13 or data center 14 determines whether or not such information on the delivery process is appropriate. More specifically, the cash center 13 or data center 14 determines whether or not the total amount of money inputted by the operator via the operation unit 45 is coincident with the total amount of money actually delivered to the money storage unit 40. If such information on the delivery process is determined to be appropriate, the cash center 13 or data center 14 will transmit information on this money exchange process to the control unit 15. Then, the control unit 15 controls the wrapped-coin dispensing machine 50 to dispense therefrom the wrapped coins, as the exchange money, based on the information on the money exchange process transmitted thereto from the cash center 13 or data center 14. In this case, the control authority, under which the wrapped coins dispensed from the wrapped-coin dispensing machine 50 are controlled, is changed from the second control authority (i.e., the control authority provided on the side of the designated collector) to the first control authority (i.e., the control authority provided on the side of the store). Alternatively or additionally, while controlling the wrapped-coin dispensing machine 50 to dispense therefrom the wrapped coins, the control unit 15 may serve to perform another dispensing process, by controlling the banknote handling machine 20 to dispense therefrom the banknotes temporarily stored in the recycling banknote storage units 27 of the banknote handling machine 20 (see FIG. 5B). Further, the control unit 15 may control the coin handling machine 30 to dispense the loose coins therefrom.

Further, in the above exchange from large denomination to small denomination process and/or exchange from small denomination to large denomination process, when the command for performing the money exchange process is sent to the control unit 15 by the operator via the operation unit 45, or when the command for performing the money exchange process is given to the control unit 15 from the cash center 13 or data center 14 via the controller 12 (17), the information on one or more denominations of exchange money and the information on the number or total amount of money for each denomination of exchange money are also inputted to the control unit 15. Then, the control unit 15 will control the money handling machine 10 to dispense therefrom the money of the inputted one or more denominations of exchange money, based on the inputted number or total amount of money. More specifically, the control unit 15 can serve to control the wrapped-coin handling machine 50 and/or banknote handling machine 20 to dispense therefrom the wrapped coins and/or banknotes of the inputted one or more denominations of exchange money, based on the inputted number or total amount of money.

In the money handling machine 10, as shown in FIG. 4, the memory unit 47 is connected with the control unit 15. This memory unit 47 can serve to store therein information on one or more money exchange patterns, provided for each operator and including the denomination or denominations of exchange money and the number or total amount of money for each denomination of exchange money regarding the money exchange process.

With this configuration, once the information on the operator is identified by the card reader 46 after it reads the ID information of the ID card carried by this operator, the control unit 15 controls the display unit 44 to display thereon the money exchange pattern or patterns stored in the memory unit 47. Otherwise, when identifying the information of each operator, a part of the body of the operator may be checked. In any case, once a certain money exchange pattern is selected by the operator via the operation unit 45 from the money exchange pattern or patterns displayed on the display unit 44, the control unit 15 controls the money handling machine 10 to dispense therefrom the money of one or more denominations of exchange money in the selected money exchange pattern, based on the number or total amount of money stored in the memory unit 47. More specifically, the control unit 15 can serve to control the wrapped-coin dispensing machine 50 and/or banknote handling machine 20 to dispense therefrom the wrapped coins and/or banknotes of one or more denominations of exchange money, (such one or more denominations are stored in the memory unit 47 and selected via the operation unit 45), based on the number or total amount of money also stored in the memory unit 47.

It is noted that the aforementioned memory unit, which is adapted for storing therein information on the one or more money exchange patterns, provided for each operator and including one or more denominations of exchange money and the number or total amount of money for each denomination of exchange money regarding the money exchange process, is not limited to one (i.e., the memory unit 47) designed to be connected with the control unit 15 in the money handling machine 10. For instance, a proper control means may be provided to the ID card carried by each operator.

(Checking Process)

Now, the checking process for the banknotes and/or coins will be described in brief. The checking process for the banknotes is provided for first counting the banknotes present in the banknote handling machine 20, and then ejecting such counted banknotes through the banknote reject slot 22 in order to check the number and/or total amount of money of such ejected banknotes, and finally depositing again such checked banknotes. Meanwhile, the checking process for the coins includes two checking modes, i.e., a normal checking mode and an automatic checking mode. The normal checking mode for the coins is provided for first counting the coins present in the coin handling machine 30, and then ejecting such counted coins through the coin return slot 32 in order to check the number and/or total amount of money of such ejected coins, and finally depositing again such checked coins. The automatic checking mode is provided for once feeding the coins present in each recycling coin storage unit 34 onto the lateral transport unit 38, and then feeding out the coins from the coin feeding unit 33 and transporting them by the transport unit 35, and finally returning the coins to each recycling coin storage unit 34 via the escrow unit 39 for each denomination. In this case, the operator can select either of the former (or normal) checking mode or latter (or automatic) checking mode regarding the checking process for the coins, via the operation unit 45, while watching the display unit 44.

(Counting Process)

Next, the counting process for the banknotes and/or coins will be described in brief. The counting process for the banknotes and/or coins is provided for counting the banknotes and/or coins at hand. More specifically, the counting process for the banknotes is provided for first feeding the banknotes into the banknote handling machine 20, and then temporarily holding the normal banknotes in the banknote holding unit 29 and feeding abnormal banknotes to the banknote reject slot 22 in order to reject them, while counting the banknotes during such operations, and finally operating the door 24 to be automatically opened, thereby allowing the operator to take out the banknotes present in the banknote holding unit 29. Meanwhile, the counting process for the coins is provided for first feeding the coins into the coin handling machine 30, and then further feeding the normal coins to the lateral transport unit 38 through the overflowing sorting hole 36, while feeding abnormal coins to the coin return slot 32 in order to remove such rejected coins, and after removing such rejected coins from the coin return slot 32, finally feeding the coins fed to the lateral transport unit 38 to the coin return slot 32, through the coin feeding unit 33 and transport unit 35, thereby allowing the operator to take out the coins finally fed to the coin return slot 32.

(Closing Operation)

Next, the closing operation will be described in brief. When the closing command is inputted to the control unit 15 by the operator via the operation unit 45, or when the closing command is sent to the control unit 15 from the cash center 13 or data center 14 via the controller 12 (17), the closing data, i.e., the data on the number of money for each denomination or data on the total amount of money or amount of money for each denomination, will be totalized, in regard to the banknotes stored in the banknote storage cassette 41 and the coins stored in the coin storage cassette 42, due to the delivery process performed in a predetermined period of time, e.g., during a period of time between the previous closing process and the present closing process. Thereafter, the so-obtained closing data will be transmitted to the central control unit.

(Collection by Staff Process)

Next, the collection by staff process will be described in brief. Once the command for the collection by staff process is sent to the control unit 15 by the operator via the operation unit 45, the control unit 15 will unlock a door of the money storage unit 40, thereby to allow the banknote storage cassette 41 and coin storage cassette 42 to be respectively taken out from the money storage unit 40. In this state, the staff or the like being present on the side of the designated collector can take out each of the cassettes, while exchanging them with new cassettes. Thereafter, once the staff or the like closes the door, the collection by staff data, i.e., the data on the number of money for each denomination or data on the total amount of money or amount of money for each denomination, in regard to the collected banknotes and/or coins, will be transmitted to the central control unit.

Each of the above processes, except for the delivery process included in the depositing process in the mode with the delivery process, can be started, when the operator selects one of such processes, inputs the command necessary for the process via the operation unit 45, and then pushes the start key. Further, in regard to the supplement process or depositing process, if the confirmation key is pushed down during a predetermined period of time in which the clear key is allowed to be pushed down, the process can be confirmed to be completed.

Alternatively, as described above, the cash center 13 or data center 14 can transmit at least one of the closing command, delivery command, collection by staff command, depositing command, dispensing command, supplement command, checking command, exchange from large denomination to small denomination command, exchange from small denomination to large denomination command, counting command, reset command, confirmation command, start command, unlocking command and program download command, to the money handling machine 10. Such commands are respectively provided as an alternative to the operation of the operation unit 45 for each corresponding process.

Meanwhile, the money handling machine 10 is configured to transmit the signal indicative of at least one of the closing data, delivery data, collection by staff data, total amount money data of the recycling money storage unit, depositing data, dispensing data, supplement data, checking data, exchange from large denomination to small denomination data, exchange from small denomination to large denomination data, counting data, total amount money data of the system, system data, failure data and program data, to the cash center 13 or data center 14.

In this way, each of the information on the money handling machine 10 can be obtained, as needed, from the cash center 13 or data center 14. Therefore, the money handling system can be operated, without any authorized operator being always present in the store. Further, the above data may include the date and time on which certain information is obtained, as well as include recognition information on the store and/or recognition information on the money handling machine. Thus, the information on the date and time on which certain data was obtained, as well as the information on the money handling machine from which the data was sent, and any other like information can be clarified. Additionally, with respect to the closing data, delivery data, collection by staff data, depositing data, dispensing data, supplement data, checking data, exchange from large denomination to small denomination data, exchange from small denomination to large denomination data, counting data and failure data, such data may include the information on the operator, such as the ID information thereof or the like, and/or information on the date and time on which a certain operation was performed by the operator. Thus, the information on the date, time and manner that the money was handled in the money handling machine 10, the information on the person who performed the certain operation, as well as the information on the money handling machine 10 that handled the money, can be managed.

In the above embodiment, the cash center 13 and data center 14 are respectively explained as the central control units having the same control authority. However, the cash center 13 may be arranged to be controlled under a different control authority than the control authority under which the data center 14 is controlled.

Figure 1C:
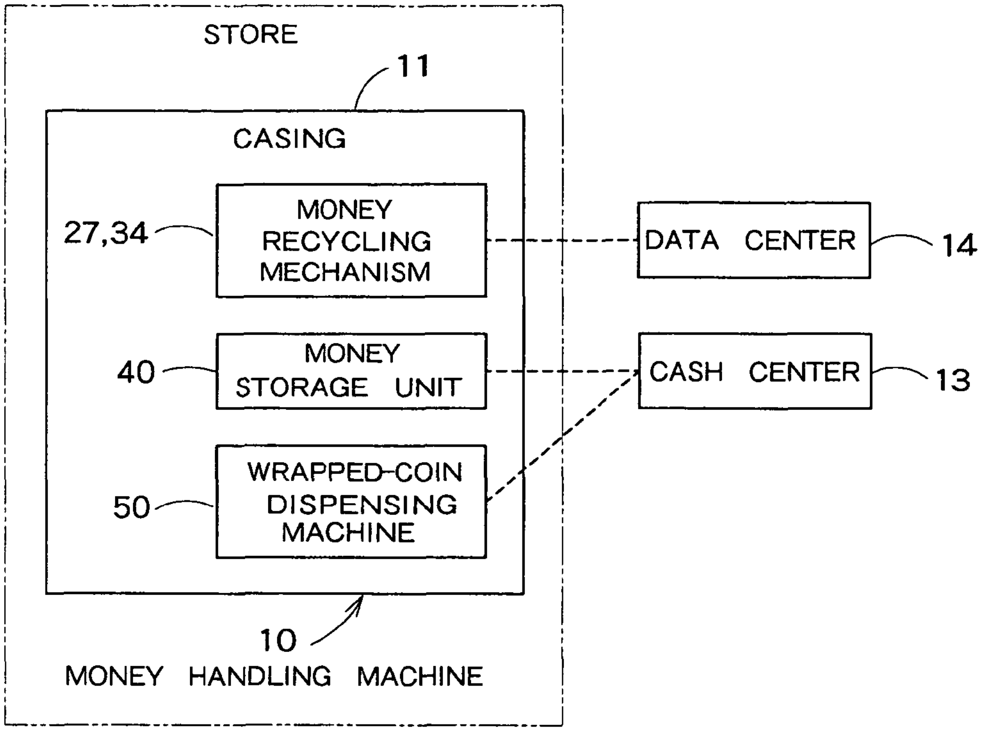
FIG. 1C is a block diagram illustrating still another construction of the money handling system related to the embodiment of the present invention.

More specifically, as shown in FIG. 1C, the cash center may be arranged to be controlled under the control authority provided on the side of the designated collector, and thus adapted for transmitting and receiving the data and/or command related to the money storage unit 40 and wrapped-coin dispensing unit 50, respectively arranged to be controlled under the designated collector. Meanwhile, the data center 14 may be arranged to be controlled under the control authority provided on the side of the store, and hence adapted for transmitting and receiving the data and/or command related to the money recycling unit (i.e., the recycling banknote storage units 27 and/or recycling coin storage units 34) arranged to be controlled on the side of the store. In this case, the data may be exchanged, as needed, between the cash center 13 and the data center 14.

This configuration can securely prevent one part provided to the money handling system and arranged to be controlled under one control authority, from being unduly accessed by the people who do not have the one control authority, while operating the money handling system, even though such an authorized operator is not always present in the store.

Figure 1D:
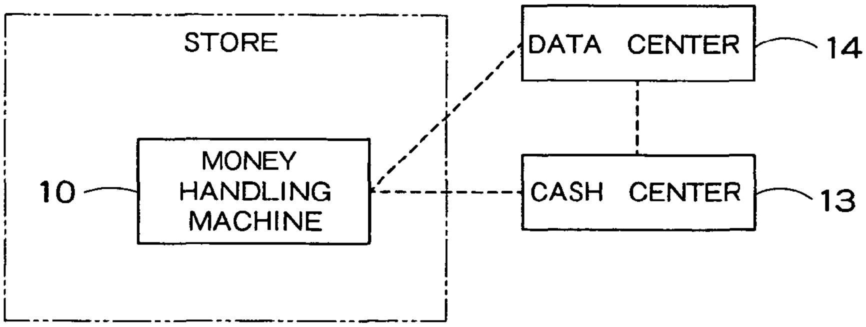
FIG. 1D is a block diagram illustrating still yet another construction of the money handling system related to the embodiment of the present invention.

Further, as shown in FIG. 1D, the data center 14 may be adapted for receiving the data or the like related to the money recycling storage unit (i.e., the recycling banknote storage units 27 and recycling coin storage units 34) from the money handling machine 10 and then transmitting such data to the cash center 13, while the cash center 13 may be adapted for receiving the data transmitted from the data center 14 and then transmitting a certain command to the money handling machine 10, based on such received data.

With this configuration, even though a plurality of central control units are provided to the money handling system, this money handling system can be operated by only the authorized operator stationed at the cash center 13, without any authorized operator being present in the store.

As described above, according to the money handling system of this embodiment, the money handling machine 10 includes the wrapped-coin dispensing machine 50 configured for dispensing the wrapped coins to the exterior of the system. In this case, the wrapped-coin storage cassettes (or wrapped-coin storage units) 51*a* to 51*g* are respectively arranged in the wrapped-coin dispensing machine 50, such that the wrapped coins can be stored in each of such storage cassettes 51*a* to 51*g* and dispensed therefrom. The central control unit provided to the cash center 13 and/or data center 14 can serve to transmit and receive the signal relative to each of the money storage unit 40 and wrapped-coin dispensing unit 50 in the money handling machine 10. Accordingly, such provision of the wrapped-coin dispensing machine 50 to the money handling machine 10, with the signal transmission and reception of the signal being enabled between the central control unit and the wrapped-coin dispensing machine 50, can achieve adequate preparation of the wrapped coins, in addition to the loose banknotes and/or loose coins, as the fund of the store, such as the changes or the like, in the money handling system.

The invention claimed is:

1. A money handling system for depositing and/or dispensing money, the system comprising:

a money handling machine including a money storage unit configured for storing therein the money, a money recycling unit adapted for temporarily storing the money taken from the exterior to the interior of the money handling machine, in a recycling money storage unit, after the money is recognized, as well as adapted for feeding the money once stored in the recycling money storage unit to the money storage unit and/or dispensing such money to the exterior of the money handling machine, a wrapped-coin dispensing unit adapted for storing wrapped coins, in a wrapped-coin storage unit, as well as adapted for dispensing the wrapped coins stored in the wrapped-coin storage unit to the exterior of the money handling machine, and a control unit adapted for controlling the money storage unit, the money recycling unit and the wrapped-coin dispensing unit; and a central control unit connected, for communication, with the money handling machine and capable of performing remote control of the money handling machine;

wherein the central control unit is adapted for transmitting and receiving a signal relative to each of the money storage unit and the wrapped-coin dispensing unit, in the money handling machine;

wherein the money recycling unit is arranged to be controlled under a first control authority, while the money storage unit and wrapped-coin dispensing unit are respectively arranged to be controlled under a second control authority.

2. The money handling system according to claim 1, wherein, once the money stored in the recycling money storage unit of the money recycling unit is fed to the money storage unit, the control authority, under which such money is controlled, is changed from the first control authority to the second control authority, and then the total amount of money, corresponding to the money fed to the money storage unit, is deposited to an account of a financial institution related to the first control authority, and once the wrapped coins stored in the wrapped-coin storage unit of the wrapped-coin dispensing unit is dispensed to the exterior of the money handling machine, the control authority, under which such wrapped coins are controlled, is changed from the second control authority to the first control authority, and then the total amount of money, corresponding to such wrapped coins, is withdrawn from the account of the financial institution related to the first control authority.

3. The money handling system according to claim 1, wherein the money handling system further comprises an operation unit adapted for allowing an operator to select a plurality of operation modes including a money exchange mode, and when the money exchange mode is selected via the operation unit, the control unit of the money handling machine serves to control the money storage unit to store therein the money deposited into the money handling machine, and then control the money recycling unit and/or the wrapped-coin dispensing unit to dispense the exchange money, and finally transmit information on this money exchange process to the central control unit.

4. The money handling system according to claim 1, wherein the money handling system further comprises an operation unit adapted for allowing an operator to select a plurality of operation modes including a money exchange mode, when the money exchange mode is selected via the operation unit, the control unit of the money handling machine serves to control the money storage unit to store therein the money deposited into the money handling machine, and then transmits information on this storage process to the central control unit, the central control unit serves to determine whether or not the information on the storage process is appropriate, and when determining that the information on the storage process is appropriate, the central control unit transmits information on the money exchange process to the control unit of the money handling machine, and the control unit of the money handling machine serves to control the money recycling unit and/or wrapped-coin dispensing unit to dispense the exchange money, based on the information on the money exchange process transmitted from the central control unit.

5. The money handling system according to claim 3, wherein, when the money exchange mode is selected via the operation unit, one or more denominations of exchange money and the number or total amount of money for each denomination of exchange money are inputted via the operation unit, and the control unit serves to control the money recycling unit and/or wrapped-coin dispensing unit to dispense the money of the inputted one or more denominations of exchange money, from the money handling machine, based on the inputted number or total amount of money.

6. The money handling system according to claim 3, wherein the money handling system further comprises an operator identification unit adapted for identifying information on the operator, a memory unit adapted for storing therein information on one or more money exchange patterns, provided for each operator and including one or more denominations of exchange money and the number or total amount of money for each denomination of exchange money regarding the money exchange process, and a selection unit configured for allowing the operator to select the one or more money exchange patterns stored in the memory unit, and once the information of the operator is identified by the operator identification unit, the control unit serves to control the money recycling unit and/or wrapped-coin dispensing unit to dispense the money of one or more denominations of exchange money in one money exchange pattern selected by the operator via the selection unit, among the one or more money exchange patterns stored in the memory unit, from the money handling machine, based on the number or total amount of the money stored in the memory unit.

7. The money handling system according to claim 4, wherein, when the money exchange mode is selected via the operation unit, one or more denominations of exchange money and the number or total amount of money for each denomination of exchange money are inputted via the operation unit, and the control unit serves to control the money recycling unit and/or the wrapped-coin dispensing unit to dispense the money of the inputted one or more denominations of exchange money, from the money handling machine, based on the inputted number or total amount of money.

8. The money handling system according to claim 4, wherein the money handling system further comprises an operator identification unit adapted for identifying information on the operator, a memory unit adapted for storing therein information on one or more money exchange patterns, provided for each operator and including one or more denominations of exchange money and the number or total amount of money for each denomination of exchange money regarding the money exchange process, and a selection unit configured for allowing the operator to select the one or more money exchange patterns stored in the memory unit, and once the information of the operator is identified by the operator identification unit, the control unit serves to control the money recycling unit and/or wrapped-coin dispensing unit to dispense the money of one or more denominations of exchange money in one money exchange pattern selected by the operator via the selection unit, among the one or more money exchange patterns stored in the memory unit, from the money handling machine, based on the number or total amount of the money stored in the memory unit.

* * * * *